F. O. KILGORE.
CUSHIONING DEVICE.
APPLICATION FILED DEC. 22, 1905.
923,858.
Patented June 8, 1909.
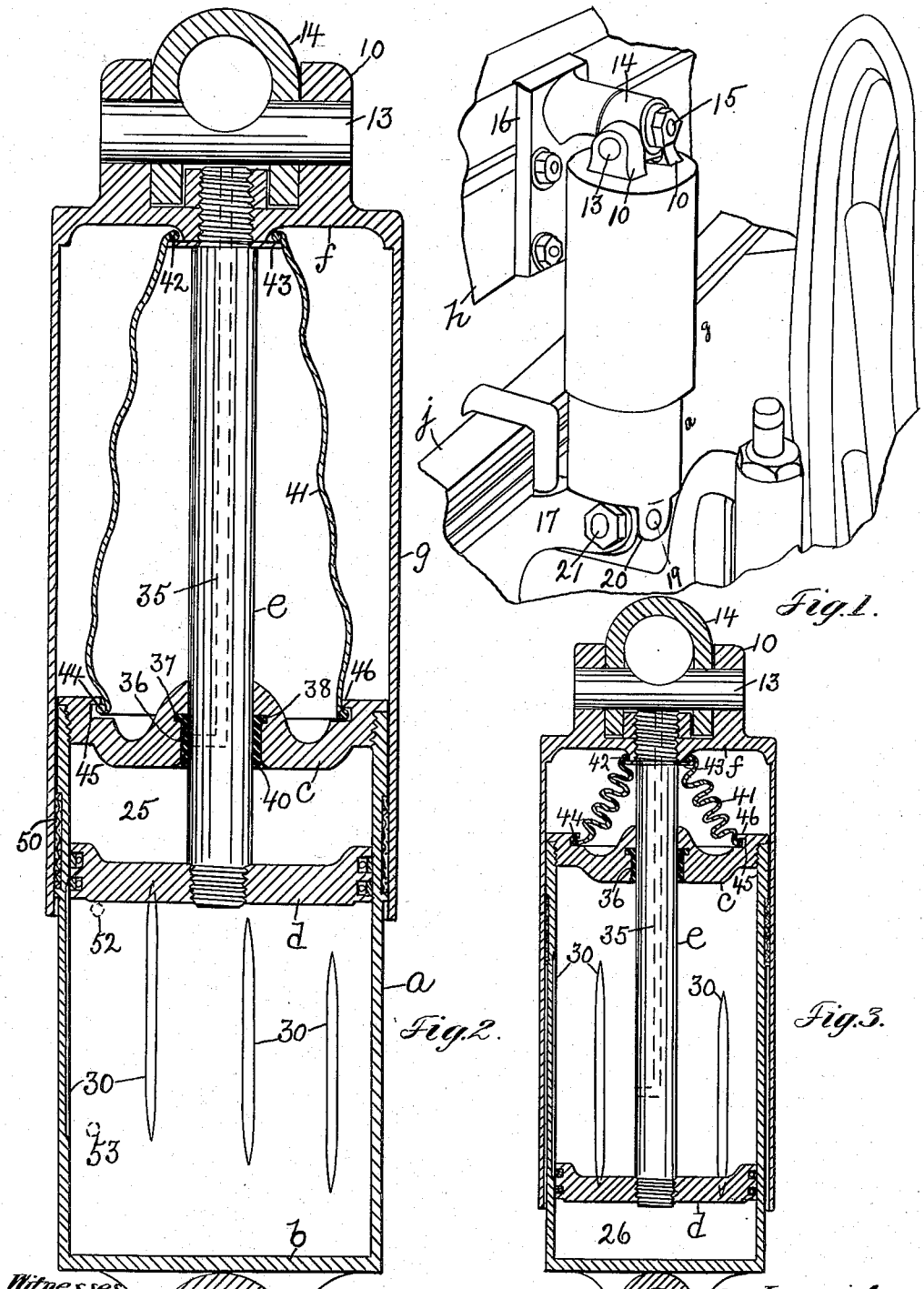

UNITED STATES PATENT OFFICE.

FREDERICK O. KILGORE, OF MINNEAPOLIS, MINNESOTA, ASSIGNOR TO KILGORE MANUFACTURING COMPANY, OF OLDTOWN, MAINE, A CORPORATION OF MAINE.

CUSHIONING DEVICE.

No. 923,858.　　　Specification of Letters Patent.　　　Patented June 8, 1909.

Application filed December 22, 1905. Serial No. 292,908.

*To all whom it may concern:*

Be it known that I, FREDERICK O. KILGORE, a citizen of the United States, residing in Minneapolis, in the county of Hennepin, in the State of Minnesota, have invented an Improvement in Cushioning Devices, of which the following description, in connection with the accompanying drawings, is a specification, like characters on the drawings representing like parts.

This invention relates to a cushioning device or apparatus especially adapted for use on automobiles and other vehicles for the purpose of reducing to a minimum the evil effects of jars or shocks due to uneven roads and thereby obtain an easier riding vehicle.

The invention further has for its object to provide a cushioning device which does not interfere with the natural movement within limits of the springs employed to support the body of the vehicle, but which becomes effective to take care of any movement of said springs in excess of their natural movement.

The invention further enables variation in the different body-supporting springs to be compensated for, so that the action of springs of different flexibility may be made uniform.

Another feature of the invention consists in providing means for protecting the moving parts of the apparatus from the injurious cutting effect of dust, thereby prolonging the life and effectiveness of the apparatus.

These and other features of this invention will be pointed out in the claims at the end of this specification.

Figure 1 represents in perspective a sufficient portion of a vehicle provided with a cushioning device embodying this invention. Fig. 2, a longitudinal section on an enlarged scale of the cushioning device shown in Fig. 1, and Fig. 3, a similar section on a smaller scale of the device in its closed or contracted position.

The cushioning device herein shown as embodying this invention, consists of a member $a$ preferably cylindrical in shape which is provided with heads $b$, $c$ and contains a piston $d$ having its rod $e$ extended through the head $c$ and secured to the head $f$ of a larger cylindrical member $g$ which is open at one end for the reception of the member $a$. The member $g$ is designed to be secured to the body $h$ of an automobile or other vehicle and the member $a$ to the spring $j$ or it may be to the axle of the vehicle.

The attachment of the member $g$ to the body $h$ of the vehicle may be effected in any suitable manner and preferably as herein shown, so as to obtain a universal joint between the member $g$ and said body. For this purpose the member $g$ is provided with lugs or ears 10 which support a shaft 13 on which is loosely mounted a sleeve 14, through which is extended a stud, shaft or pin 15 on a bracket 16 attached to the body of the vehicle.

The member $a$ is pivotally secured to a bracket 17 in a similar manner, a sleeve 18 being mounted loosely on a shaft 19 supported by ears 20 on said member, and the said sleeve being free to turn on a shaft or pin 21 supported by the bracket 17. The sleeves 14, 18 are thus capable of turning on their shafts in two directions substantially at right angles to each other.

The piston $d$ within the member $a$ moves with the member $g$, and provision is made for an elastic cushion for the said piston as it approaches the end of its movement in opposite directions. The elastic cushion referred to, is formed by closed chambers 25, 26, between the heads $c$, $b$ of the member $a$ and the piston $d$ (see Figs. 2 and 3), whereby a body of elastic fluid, such as air, may be confined between said piston and the head toward which it is moved, thereby limiting the movement of the piston in opposite directions and preventing the piston striking the said heads and insuring stopping of the piston and the load attached to it, in the present instance, the body of the vehicle and its passengers or other contents, in an easy and effective manner with the least possible jar or shock.

The closed chambers 25, 26 formed by the heads $c$, $b$ and the piston $d$ when the latter reaches a predetermined point in its stroke in opposite directions may be supplied with air when the piston reaches a predetermined point in its movement in the opposite direction, and this may be accomplished by establishing communication between the space or portion of the cylinder $a$ on one side of the piston $d$ and the portion of said cylinder on the opposite side of said piston or with the atmosphere.

It is preferred to provide for the passage of air or other elastic medium from one side of the piston $d$ to the other during a limited portion of the stroke of the piston, namely, from the point of cut-off near one end of the cylinder or member $a$ to the point of cut-off near the opposite end thereof, and this result may be accomplished by means of one or more grooves or channels 30 formed on the inner circumference of the cylinder $a$ and constituting vents or ports.

As represented in Fig. 2, the vents 30 are cut off by the piston from the chamber 25, consequently further movement of the piston upward or toward the head $c$ is resisted and limited by a confined body of elastic fluid. In Fig. 3, the vents 30 are cut off by the piston $d$ from the chamber 26, consequently further movement of the piston in a downward direction or toward the head $b$ is resisted and limited by a confined body of elastic fluid. In this manner, abnormal or excessive movement of the body of the vehicle in either direction is resisted by a confined body of air or other elastic fluid, consequently severe jars or shocks to the body of the vehicle and its load are avoided.

The vent port or ports 30 permit the passage of air back and forth from one side of the piston to the other to balance the same, and, therefore, the piston is free to respond to the natural movement of the springs within the limits of the points of cut-off, thereby enabling the body under normal conditions to respond to the springs $j$, which may be made of minimum lightness and maximum flexibility, inasmuch as any vibration or movement of the spring beyond the normal is immediately taken care of by the confined air cushions. By making the ports or vents of different length or arranging ports or vents of the same length so that one extends beyond the other, the movement of the body of the vehicle may be stopped gradually.

By proportioning the size of the vents or ports 30, to the strength or stiffness of the spring which supports the load, the action of the air cushion on springs of different flexibility may be controlled so as to have all the springs act in a uniform manner, and so also excessive vibration of some of the springs may be controlled by the size of the vents.

I may prefer to make the vents or ports 30 on the inner circumference of the cylinder $a$, as such construction enables the cylinder or hollow member $a$ to be closed air-tight, but I do not desire to limit my invention in this respect, as the cylinder or member $a$ may be vented to the atmosphere at a point intermediate of where the dead end chambers are formed by the piston, as for instance, as illustrated by the dotted line port or passage 35 made in the piston rod $e$, one mouth of which is adapted to be closed by a packing sleeve 36, when the piston has reached a predetermined point in its up-stroke.

The packing sleeve 36 is provided with a flange or rim 37 at one end which fits into an annular recess 38 in the head $c$ and the free end of said sleeve is rounded or beveled on its outer side as at 40, so that when the piston is moved toward the head $c$ to form the closed chamber 25, the pressure of the air will act on the exterior beveled end of the packing sleeve and force it against the piston rod, thus securing an air-tight joint around the said rod.

Provision is also made for preventing dust from accumulating on the piston rod, which might in time cut the packing and thereby necessitate replacing of the same at a considerable cost and inconvenience, and for this purpose, I employ a hood or covering 41 of leather, cloth, rubber or other flexible or collapsible material, which surrounds the piston rod $e$ within the cylinder $g$, and which responds to the movement of the cylinder $g$. In the present instance, the hood or dust guard 41 is made conical in form and its upper end is attached to a ring 42 which rests upon a washer 43 on the piston rod $e$, and the lower end of said dust guard or hood is attached to a ring 44 which is snapped into an annular recess or groove 45 in the head $c$ and retained therein by a flange 46. In Fig. 2, the hood or dust guard 41 is shown as in its extended condition, and in Fig. 3 in its collapsed condition, and in both it will be observed that the portion of the piston rod within the cylinder $g$ is inclosed by the hood and thus protected from dust which might gain access to the cylinder $a$.

The admission of dust into the cylinder $g$ may be guarded against by means of a ring 50 of felt or other suitable material located in an annular groove in the outer circumference of the cylinder $a$ and making contact with the inner circumference of the outer cylinder $g$, the said ring also serving as an anti-rattler.

While it is preferred to make the cylinder $a$ closed to the atmosphere and thereby avoid the injurious effects of the dust upon the parts within said cylinder, it is not desired to limit the invention in this respect, as the advantages of the dead air chambers at the opposite ends of the cylinder $a$ may be obtained in an apparatus in which the said cylinder communicates with the air through the ports 52, 53 indicated by dotted lines in Fig. 2, which ports are located intermediate the ends of the cylinder and at the points of cut-off in the stroke of the piston in opposite directions.

I have herein shown one construction of apparatus embodying this invention, but I do not desire to limit my invention to the particular construction shown.

It is preferred to use an elastic fluid, such as air, and to arrange the cut-offs so as to form dead air chambers at opposite ends of the cylinder $a$, but it is not desired to limit the invention in this respect, as a liquid may be employed, in which case the vents 30 are extended to the opposite ends of the cylinder and are made decreasing toward their ends. The ports 30 may also be made tapering or decreasing at their ends as shown in Fig. 2 when air is employed.

Claims—

1. In an apparatus of the character described, in combination, a cylinder closed at its sides and ends and provided on its interior with a longitudinally extended groove or channel, a piston located in said cylinder and coöperating with said groove to form closed chambers at the opposite ends of said cylinder, said groove affording a vent passage from one side of the said piston to the other while the piston is located at points intermediate the ends of said cylinder, a piston rod extended through one end of said cylinder, a second cylinder connected to said piston rod and into which the first mentioned cylinder is extended, and a dust guard or hood encircling the piston rod within the second cylinder, substantially as described.

2. In an apparatus of the character described, in combination, a cylinder closed at its ends, a piston therein having its rod extended through one end, and a dust guard surrounding said piston rod outside of said cylinder and movable toward and from the said cylinder as the piston rod is moved into and out of said cylinder, and means for supporting said guard to permit it to be turned freely about said piston rod, substantially as described.

3. In an apparatus of the character described, a cylinder closed at its sides and ends, a piston within said cylinder, a piston rod for said cylinder extended through one end thereof and provided with a passage communicating at one end outside of said cylinder and having its other end removed from said piston and arranged to be closed by the end of the cylinder through which it passes, substantially as described.

In testimony whereof, I have signed my name to this specification in the presence of two subscribing witnesses.

FREDERICK O. KILGORE.

Witnesses:
JAS. H. CHURCHILL,
J. MURPHY.